(12) United States Patent
Hébert et al.

(10) Patent No.: US 9,325,974 B2
(45) Date of Patent: Apr. 26, 2016

(54) SENSOR POSITIONING FOR 3D SCANNING

(75) Inventors: Patrick Hébert, Québec (CA); Dragan Tubic, Québec (CA); Olivier Gignac, Charny (CA); Éric Saint-Pierre, Lévis (CA); Félix Rochette, Québec (CA); Alexandre Carette, Québec (CA)

(73) Assignee: CREAFORM INC., Levis (CA)

( * ) Notice: Subject to any disclaimer, the term of this patent is extended or adjusted under 35 U.S.C. 154(b) by 213 days.

(21) Appl. No.: 14/122,702

(22) PCT Filed: Jun. 7, 2012

(86) PCT No.: PCT/IB2012/052889
§ 371 (c)(1),
(2), (4) Date: Nov. 27, 2013

(87) PCT Pub. No.: WO2012/168904
PCT Pub. Date: Dec. 13, 2012

(65) Prior Publication Data
US 2014/0085429 A1 Mar. 27, 2014

Related U.S. Application Data

(60) Provisional application No. 61/494,075, filed on Jun. 7, 2011.

(51) Int. Cl.
*H04N 15/00* (2006.01)
*H04N 13/02* (2006.01)
(Continued)

(52) U.S. Cl.
CPC ............ *H04N 13/0275* (2013.01); *G01S 5/163* (2013.01); *G06T 7/0018* (2013.01); *G06T 2207/10028* (2013.01); *G06T 2207/30204* (2013.01)

(58) Field of Classification Search
None
See application file for complete search history.

(56) References Cited

U.S. PATENT DOCUMENTS

| 6,137,491 A | 10/2000 | Szeliski |
| 6,922,632 B2 | 7/2005 | Foxlin |

(Continued)

FOREIGN PATENT DOCUMENTS

| CA | 2256587 A1 | 12/1997 |
| CA | 2656163 A1 | 9/2006 |

(Continued)

OTHER PUBLICATIONS

Blais, "A Review of 20 Years of Range Sensor Development", Journal of Electronic Imaging, Jan. 2004, pp. 231-243, vol. 13 (1), NRC.

(Continued)

*Primary Examiner* — Frederick Bailey
*Assistant Examiner* — Talha M Nawaz
(74) *Attorney, Agent, or Firm* — Fasken Martineau Dumoulin LLP (57) ABSTRACT

A method for obtaining a refined pose for a 3D sensor for online 3D modeling of a surface geometry of an object, the pose encompassing six degrees of freedom (DOF) including three translation parameters and three orientation parameters, the method comprising: providing the 3D sensor, the 3D sensor being adapted to capture 3D point measurements of the surface of the object from a viewpoint; providing a geometry model of at least part of the surface; observing a portion of the surface of the object with the 3D sensor; measuring an initialization pose for the 3D sensor by at least one of positioning device pose measurement, predicted pose tracking and target observation; finding a best fit arrangement of the 3D point measurements in the geometry model using the initialization pose; generating the refined pose for the 3D sensor using the best fit arrangement.

10 Claims, 10 Drawing Sheets

(51) Int. Cl.
*G01S 5/16* (2006.01)
*G06T 7/00* (2006.01)

(56) References Cited

U.S. PATENT DOCUMENTS

| | | | |
|---|---|---|---|
| 6,985,238 B2 | 1/2006 | Isaacs et al. | |
| 7,768,656 B2 | 8/2010 | Lapa et al. | |
| 7,912,673 B2 | 3/2011 | Hébert et al. | |
| 8,032,327 B2 | 10/2011 | Hebert et al. | |
| 8,082,120 B2* | 12/2011 | St-Pierre | G01B 11/2513 356/601 |
| 8,090,194 B2 | 1/2012 | Golrdon et al. | |
| 2003/0234941 A1 | 12/2003 | Mundy et al. | |
| 2004/0057057 A1* | 3/2004 | Isaacs | G01B 11/24 356/601 |
| 2008/0075324 A1 | 3/2008 | Sato et al. | |
| 2008/0201101 A1* | 8/2008 | Hebert | G01B 11/245 702/152 |
| 2009/0097039 A1 | 4/2009 | Kawasaki et al. | |
| 2010/0046801 A1 | 2/2010 | Ishiyama | |
| 2011/0134225 A1 | 6/2011 | Saint-Pierre et al. | |
| 2012/0099798 A1 | 4/2012 | Saruta et al. | |

FOREIGN PATENT DOCUMENTS

| | | |
|---|---|---|
| CN | 101026776 A | 8/2007 |
| CN | 101089551 A | 12/2007 |
| CN | 101292131 A | 10/2008 |
| CN | 101611291 A | 12/2009 |
| CN | 102042814 A | 5/2011 |
| CN | 102175182 A | 9/2011 |
| JP | H08136220 A | 5/1996 |
| JP | 2002521683 A | 7/2002 |
| WO | 99/60525 A1 | 11/1999 |
| WO | 2012168904 A2 | 12/2012 |

OTHER PUBLICATIONS

Zhang et al., "Rapid Shape Acquisition Using Color Structured Light and Multi-pass Dynamic Programming", pp. 1-13. Available on the Internet at http://grail.cs.washington.edu/projects/moscan/paper.pdf on Nov. 23, 2012.

Vuylsteke et al., "Range Image Acquisition with a Single Binary-Encoded Light Pattern", IEEE Transaction on Pattern Analysis and Marchine Intelligence, Feb. 1990, pp. 148-164, vol. 12, No. 2.

Heikkilä, "Geometric camera calibration using circular control points", Pattern Analysis and Machine Intelligence, IEEE Transactions on, Oct. 2000, pp. 1066-1077, vol. 22, No. 10.

Ouellet et al., "Geometric Calibration of a Structured Light System Using Circular Control Points", in Proceedings of the Fourth 3D Data Processing, Visualization and Transmission, Jun. 2008, pp. 1-8, Proceedings of 3DPVT, Atlanta, GA, USA.

Salvi et al, "Pattern Codification Strategies in Structured Light Systems", Pattern Recognition, 2004, pp. 827-849, vol. 37 Elsevier Ltd.

Trucco et al., "Introductory Techniques for 3-D Computer Vision", Chapter 11, 1998, pp. 292-293, Prentice Hall, United States.

Gelfand et al., "Geometrically Stable Sampling for the ICP Algorithm", Fourth International Conference on 3D Digital Imaging and Modeling, Oct. 6-10, 2003, 9 pages, Stanford University, USA.

Gelfand et al., "Shape Segmentation Usign Local Slippage Analysis", Eurographics Symposium on Geometry Processing, 2004, 10 pages, The Eurographics Association 2004, USA.

Hebert, "A Self-Referenced Hand-Held Range Sensor", Third International Conference on 3 D Digital Imaging and Modeling, May 28-Jun. 1, 2001, pp. 5-12, IEEE, Canada.

Guehring, "Reliable 3D surface acquisition, registration and validation using statistical error models", Third International Conference on 3 D Digital Imaging and Modeling, May 28-Jun. 1, 2001, pp. 224-231, IEEE, Canada.

Guehring, "Reliable 3D surface acquisition, registration and validation using statistical error models", Third International Conference on 3-D Digital Imaging and Modeling, May 28-Jun. 1, 2001 pp. 224-231, IEEE, Quebec City.

* cited by examiner

SENSOR POSITIONING FOR 3D SCANNING

This application is a national phase entry of PCT Application No. PCT/IB2012/052889, entitled "SENSOR POSITIONING FOR 3D SCANNING" filed on Jun. 7, 2012; which in turn claims priority under 35 USC §119(e) of U.S. provisional patent application No. 61/494,075 filed on Jun. 7, 2011, the specifications of which are hereby incorporated by reference.

TECHNICAL FIELD

The present description generally relates to the field of 3D scanning and modeling of the surface geometry of an object and more particularly to the determination of the sensor pose for 3D scanning.

BACKGROUND OF THE ART

A 3D sensor captures 3D points on the surface of an object or a scene. These 3D point measurements are obtained in the coordinate system of the 3D sensor. Since the 3D sensor has a limited field of view, it is generally possible to observe only a section of the surface of the object surface from a single viewpoint. To capture a wider section of the surface, one displaces the 3D sensor, captures 3D points from the new viewpoint, measures and calculates the displacement of the 3D sensor before transforming the newly acquired 3D points in a common coordinate system. One of the challenges in 3D scanning, or more precisely in the field of 3D modeling based on 3D scanning, consists in performing this task as efficiently as possible while keeping an adequate level of accuracy for a targeted application.

3D modeling applications are numerous and spread from the industrial scan for design, part inspection, reverse engineering to modeling systems adapted to the medical domain for the production of orthotics, prostheses or anthropometric documentation. 3D scanning and modeling contribute to several other domains including arts, media, archeology as well as sciences and technologies in general.

Typically, the spatial relationship between two sensor positions will encompass six degrees of freedom (DOF) including three translation parameters and three orientation parameters. In some cases, it is possible to constrain the motion of the 3D sensor to fewer parameters. For instance, the motion of the 3D sensor can be limited to a translation. Without any limitation, in the following the six DOF case is considered.

Different approaches have been developed and implemented for obtaining the spatial relationship between two 3D sensor viewpoints. Several types of positioning devices have been developed and are available commercially.

Among them, mechanical arms allow one to attach the 3D sensor to its end effector. The mechanical arm system will provide the parameters of the spatial relationship between its end effector and a fixed coordinate system. The size, ease of usability, portability, and accuracy are some features that will affect the cost.

Optical tracking devices have better flexibility and a larger working volume since there is no need for a mechanical structure to be attached to the 3D sensor. In some cases, active or passive targets are affixed to the 3D sensor and the targets are tracked by the tracking system. However, this imposes that a minimum subset of targets be visible by the tracking system. These optical tracking systems may be active trackers or photogrammetric systems.

In the optical device category, it is also possible to affix one or more optical sensors (cameras) to the 3D sensor. These cameras will track active or passive targets set in the environment. The cameras track affixed features in the environment as opposed to tracking the 3D sensor itself.

Other types of positioning devices exist and they include electromagnetic, acoustic and inertial systems. Inertial systems do not provide a spatial relationship with respect to a fixed reference; they provide relative motion parameters of the device.

It is also known in the art to combine modalities. For instance, one can exploit an inertial system that is combined with an optical system.

Some systems are said to be auto-referenced in the sense that they do not need additional external hardware to measure their position in space. For instance the Handyscan™ technology by Creaform™ exploits the cameras integrated in the 3D sensor for both obtaining the sets of 3D points and measuring the position of targets affixed to the scene. These targets are designed to be extracted with high accuracy in the images. Moreover, the 3D sensors can learn the set of target positions during scanning and provide a level of accuracy that is comparable to that of costly positioning devices. Nevertheless, one will need to affix targets on the scene with a density sufficient to ensure that the system will always observe at least three target points at once, three being the minimum number of targets required to estimate a six DOF spatial relationship.

One can further improve flexibility of auto-referenced systems by eliminating the need to affix targets in the scene. One way to do that, exploits the measured geometry of the object with a full-field 3D sensor. Indeed, when the object is rigid (for at least the duration of the scan) and the displacement between each viewpoint is small with a large field of view overlap, the sets of 3D patches can be virtually moved in space to find the best fitting arrangement. Once the positions and orientations of the surface patches are calculated, one obtains the 3D sensor spatial relationship in a coordinate system that may be attached to one selected patch, for instance. Well known algorithms such as the Iterative Closest Point (ICP) and its numerous variants have been proposed for this type of pose refinement.

Some approaches have also been proposed for coarse registration and are applied when one cannot assume a small displacement between two 3D sensor positions. Coarse registration may rely on geometric feature recognition. The main limitation of these approaches exploiting the object geometry to calculate the sensor spatial relationship is the object geometry. In fact, it is assumed that the geometry is complex enough and contains no symmetry. Otherwise the positioning will be prone to error. For example, on a cylinder or a sphere, it is not possible to reliably calculate the six degrees of freedom. Furthermore, it is difficult to ensure a given level of accuracy which is crucial in many metrology applications. Moreover, for real-time modeling applications, coarse registration may become intractable for larger or more complex objects.

It is possible to combine texture with geometry information. Texture pixels or some feature points can be extracted and matched between viewpoints to improve the calculated sensor positions. Nevertheless, relying on these uncontrolled features may not be sufficient to maintain accuracy. It is also not simple to efficiently take advantage of both modalities using a relative weighting factor.

SUMMARY

According to one broad aspect of the present invention, there is provided a method for obtaining a refined pose for a 3D sensor for online 3D modeling of a surface geometry of an object, the pose encompassing six degrees of freedom (DOF) including three translation parameters and three orientation parameters, the method comprising: providing the 3D sensor, the 3D sensor being adapted to capture 3D point measurements of the surface of the object from a viewpoint; providing a geometry model of at least part of the surface; observing a portion of the surface of the object with the 3D sensor; measuring an initialization pose for the 3D sensor by at least one of positioning device pose measurement, predicted pose tracking and target observation; finding a best fit arrangement of the 3D point measurements in the geometry model using the initialization pose; generating the refined pose for the 3D sensor using the best fit arrangement.

In one embodiment, the positioning device pose measurement includes: providing a positioning device; and measuring sensor location information indicating a device pose of the 3D sensor relative to the geometry model using the positioning device.

In one embodiment, the predicted pose tracking includes retrieving a previous tracked pose from a previous instance of the capture of the 3D point measurements; and assigning a predicted pose to the initialization pose, the predicted pose being predicted using the previous tracked pose.

In one embodiment, the target observation includes providing at least one target on the object; providing a target model for the object, the target model including previously observed targets; observing the surface including observing at least one currently observed targets; matching the currently observed target with a corresponding previously observed target using the target model; generating at least one additional initialization parameter for said initialization pose by attributing a value for said additional initialization parameter; obtaining the initialization pose from the matched target and the target model.

In one embodiment, the method further comprises generating missing initialization parameters for the initialization pose if the initialization pose includes less than the six degrees of freedom, wherein the generating missing initialization parameters includes attributing a value for the missing initialization parameter.

In one embodiment, generating missing initialization parameters includes sampling a parameter space of the initialization pose and the finding the best fit arrangement includes using each sampled initialization parameters and selecting a converging best fit arrangement.

In one embodiment, the refined pose includes at least one parameter of the initialization pose.

In one embodiment, finding a best fit arrangement includes weighting geometry surface points and target points to find the best fit arrangement.

In one embodiment, the initialization pose includes at least one parameter measured by the positioning device pose measurement and at least one parameter measured by the target observation.

In one embodiment, the target is at least one of affixed to the surface of the object, affixed to a solidary environment of the object, created on the surface of the object, created on the solidary environment of the object, part of a distinctive shape feature of the object and part of a distinctive shape feature of the solidary environment of the object.

In one embodiment, the target is at least one of a photogrammetric target, a retro-reflective target, a coded target, a circular target, a simply reflective target, a drawn mark and a distinctive shape feature.

In one embodiment, the positioning device is at least one of a referenced mechanical device, an optical tracking device, an electromagnetic system, an acoustic system and an inertial system.

In one embodiment, obtaining the initialization pose from the matched target and the target model includes obtaining a surface normal for the target.

In one embodiment, two of the targets are currently observed targets, the target observation further comprising comparing a distance between the currently observed targets to distances between previously observed targets in the target model to eliminate candidate sites for the match.

In one embodiment, target observation further comprises selecting a candidate site for the match in the target model based on a quantity of the currently observed targets; wherein the matching including sequentially testing, at each candidate site, the currently observed targets for the match with a same number of previously observed targets in the target model and the finding the best fit arrangement includes using each tested match and selecting a converging best fit arrangement.

BRIEF DESCRIPTION OF THE DRAWINGS

The accompanying drawings, which are included to provide a better understanding of the main aspects of the invention and are incorporated in and constitute a part of this specification, illustrate example embodiments of the invention and together with the description serve to explain the principles of the invention. The accompanying drawings are not intended to be drawn to scale. In the drawings:

FIG. 4 (Prior art) shows two examples (FIG. 4A, FIG. 4B) of coded targets;

It will be noted that throughout the appended drawings, like features are identified by like reference numerals.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Registration methods based on geometry are quite flexible. Photogrammetric systems are capable of exploiting accurate target positions in the images. These features are both useful for a 3D sensor. The present system and method allow for geometry-based registration that can exploit partial positioning constraints from both types of approaches.

Concretely, one can affix even a small number of targets on an object and maintain a high level of accuracy. The targets can be photogrammetric targets, circular retro-reflective or simply reflective, drawn targets or any other types that can be accurately detected and positioned in an image.

One illustrative example is the case of a cylindrical or near cylindrical object such as a human torso, arm or leg. As will be understood, a body part is not necessarily constantly rigid. However, it is possible to make the body part rigid for a short period of time, such as during the 3D scan, by requesting that the person not move during the scan. The body part is then considered to be rigid for the duration of the modeling method.

Applying a geometry-based registration method for modeling of a near cylindrical object, such as a body part, will be accurate except for some degrees of freedom such as the translation along the near-cylinder axis or the rotation around this axis. One could then affix one target or only a very few targets along the length of the object. Normally, a recognizable pattern of targets should include at least three unaligned fixed targets present in the same image. If only a few targets are used on the object, the number of targets in the image could be lower than what is needed to recognize and reliably calculate a 6 DOF spatial relationship. However, by combining the information extracted from both the surface geometry and the position of the targets, it is possible to calculate the spatial relationship of every 3D frame in a single common coordinate system.

When an external positioning device is used, some of the positioning parameters of the external positioning device can be known to bear reliability issues. For instance, an inertial measuring system will provide better measurements for the rotation parameters than the translation parameters. The information extracted from the position of the targets could allow calculating the spatial relationship.

The pose could also be computed using information retrieved from the combination of a positioning device, some targets and geometry of the object.

Geometry-based registration algorithms are generally iterative. When applied in an online 3D modeling process, these algorithms should quickly converge, in real-time, to the refined sensor pose. Setting constraints or initializing the pose from at least one target or from the pose provided by an external positioning device will be beneficial for quick alignment during scanning and for resuming scanning after an interruption or a considerable displacement.

Fundamentals of Geometry-Based Registration with ICP

Iterative closest point (ICP) algorithms for fine registration can align a set of points with a surface model. In most cases, the set of 3D points to be aligned will be captured in a single frame. This surface model can be built from a single set of 3D points previously captured. In this process, two image frames are aligned; this is known as pairwise registration. The current frame can also be aligned with a surface model built from several observed frames that were captured before the current set of 3D points, namely the current frame. It is possible to align the current frame with a surface model built from several frames. Indeed, the overlap between the current frame and the surface model will be larger and this will yield a better estimate of the spatial relationship. For example, the surface model would be accumulated online, during the capture of the frames. In this case, the ICP could also be applied online.

There are numerous variants of ICP but the basic principle first consists in determining, for each control point in the current frame, its closest point on the surface model. Control points are points that are selected for registration. These are referred to herein as 3D points. The closest point is assumed to be the corresponding point on the surface model. Then, one computes the rigid transformation that will best align the set of 3D points with the surface model. Finally, the transformation is applied to these points and the process is repeated until convergence. The function that is minimized is $$F_1 = \Sigma_{i=1}^{N} \|R(\theta,\phi,\omega)X_i + T(t_x,t_y,t_z) - Y_i\|^2. \quad \text{(Eq. 1)}$$

In equation 1, $Y_i$ is a 3D point on the surface model (a model point) and $X_i$ is the corresponding point from the 3D point set to be aligned. R and T are respectively the 3×3 rotation matrix and 3×1 translation vector describing a rigid transformation between the set of 3D control points $\{X_i\}$ and the set of corresponding points, $\{Y_i\}$ on the surface model. The objective function $F_1$ calculates the least-squares distance between the 3D points and their corresponding closest point on the surface, after transformation. Formally, the following problem is solved:

$$\operatorname{argmin}_{\theta,\phi,\omega,t_x,t_y,t_z} \Sigma_{i=1}^{N} \|R(\theta,\phi,\omega)X_i + T(t_x,t_y,t_z) - Y_i\|^2.$$

A closed form solution exists for this problem. It is also possible to weigh each point using a weighting factor w that could differ for each point. The function to be minimized is $$F_2 = \Sigma_{i=1}^{N} w_i \|R(\theta,\phi,\omega)X_i + T(t_x,t_y,t_z) - Y_i\|^2 \quad \text{(Eq. 2)}$$

where one solves for $$\operatorname*{argmin}_{\theta,\varphi,\omega,t_x,t_y,t_z} \sum_{i=1}^{N} w_i \|R(\theta, \varphi, \omega)X_i + T(t_x, t_y, t_z) - Y_i\|^2.$$

It was shown that this method based on point-to-point correspondence might be slow to converge.

A point-to-plane formulation was proposed to increase performances. Following this scenario, the method works similarly but after determining the corresponding closest point on the surface, the local tangent plane estimated at this closest point is calculated. Then, the rigid transformation that will minimize the distance between each of the transformed 3D control points in the current frame and its corresponding tangent plane is sought. Again, the transformation is applied and the process repeated. The formulation of the objective function is slightly different in this case and might be expressed as follows:

$$F_3 = \Sigma_{i=1}^{N} w_i (N_i^T (R(\theta,\phi,\omega)X_i + T)t_x,t_y,t_z) - Y_i))^2 \quad \text{(Eq. 3)}$$

where one solves for $$\operatorname*{argmin}_{\theta,\varphi,\omega,t_x,t_y,t_z} \sum_{i=1}^{N} w_i (N_i^T (R(\theta, \varphi, \omega)X_i + T(t_x, t_y, t_z) - Y_i))^2$$

In equation 3, $N_i^T$ is the transpose of the normal vector associated with the $i^{th}$ tangent plane. The six parameters of the rigid transformation can be obtained after linearization of the developed expression. Actually, the 3D rotation matrix can be parameterized with three angles (Euler angles) which can be assumed small in the context of fine registration. Following linearization, a closed form solution can be obtained. It is worth noting that the transformation can be parameterized differently and other solutions exist. For instance, axis and angle, quaternions, canonical exponential coordinates, dual quaternions are typical examples of representations developed in the art. Of course, one can also solve using non-linear optimization tools.

ICP approaches calculate fine registration. It is assumed that an initial estimate of the pose is provided manually, from recognition of observed features, or from a positioning device.

In the case of coarse positioning, it is also possible to initialize the pose from less than three targets. In this case however, only a subset of the 6 DOF can be initialized using the targets and the remaining parameters are initialized after sampling the parameter space. For instance, using one target will constrain the 3 DOF for translation and eventually the surface normal at the target position for two more DOF. One will then initialize the geometry-based registration after sampling angular positions (1 DOF) around the target normal and solve for the refined 6 DOF pose using geometry information at each of the sampled positions. Typically, one will sample 5 to 10 angular positions to initialize ICP pose refinement. This scenario makes it possible to quickly resume scanning of the object to build the surface model after observing a target that has already been observed and integrated in the coordinate system of the surface model. One can thus affix single targets at some sites on the object and exploit them for quick coarse registration. Then, after observing a target, the system will apply an ICP pose refinement algorithm at sampled initial poses around each of these sites before identifying the one where the current frame surface geometry best fits with the surface model. When two or more target sites lead to a good fit, the system may identify an ambiguity.

With two observed targets, the same scenario can occur. Actually, the same DOF is also initialized. Interestingly, one will only have to initialize the pose at two opposite angles (180 degrees) and find the best solution using geometry information. The best solution is given where the geometric shape of the current frame fits with the 3D shape model of an object. Using two targets for coarse registration makes it possible to eliminate candidate sites after simply comparing the distance between targets.

For more flexibility during scanning, one can thus affix single, double or local groups of targets on the object. Then one can quickly resume scanning at any of these sites after finding the best site and pose where the set of targets and pose will match the geometry.

If the system also captures the texture, compatibility of the current frame aligned with the model can also be verified.

Combining Target and Geometry-Based Constraints

Figure 1:
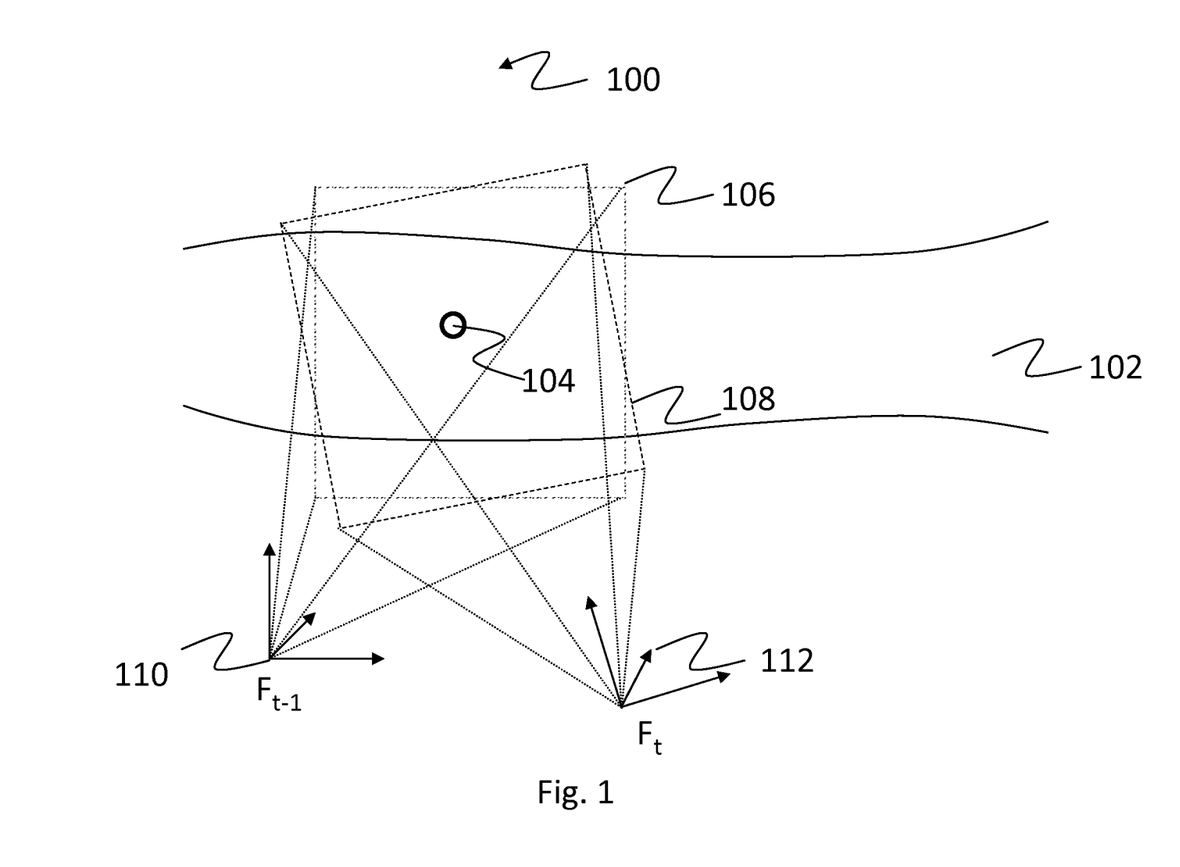
FIG. 1 shows the scanning of an object with two frames including the observation of a target.

Shown in FIG. 1 is a representation of the scanning 100 of an object 102. A target 104 is affixed to the object 102. In FIG. 1, two fields of view 106 and 108 overlap and encompass the target 104. Coordinate systems 110 and 112 are respectively associated with the reference frames, $F_{t-1}$ and $F_t$.

A first approach is described for integrating partial constraints after the observation of target points. The 3D scans are assumed to be captured with significant overlap between the fields of view. The ICP approach can then be applied. Suppose that one target has been observed at least in the current and the preceding frames, so tracking can be applied and there is no need for global recognition of target patterns. Then, it is possible to directly integrate this matched point in the formulation of $F_2$ after attributing a large weight $w_i$. Typically, the reference surface will be defined from the coordinate system $F_{t-1}$ of the scan at time t−1. It is also possible to integrate this observation in the formulation of $F_3$.

However, in this latter case, one should avoid letting the target point slide on the tangent plane. One way to do so consists in defining three orthogonal planes, for instance each being parallel to the axes of the coordinate system, including the 3D target point before assigning a relative weight to each of these planes. In this case, the function $F_3$ would be input with three more terms in the sum, for each observed target point. The three additional terms in the sum would have the same $Y_i$ and $X_i$, equal to the target position in each frame, but with different $N_i$ values. The three planes do not need to be orthogonal; their normal should not be coplanar.

Figure 4A:
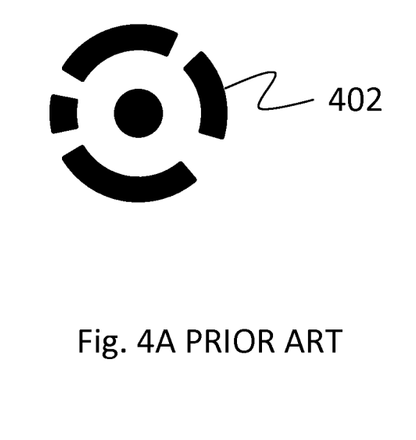
Figure 4B:
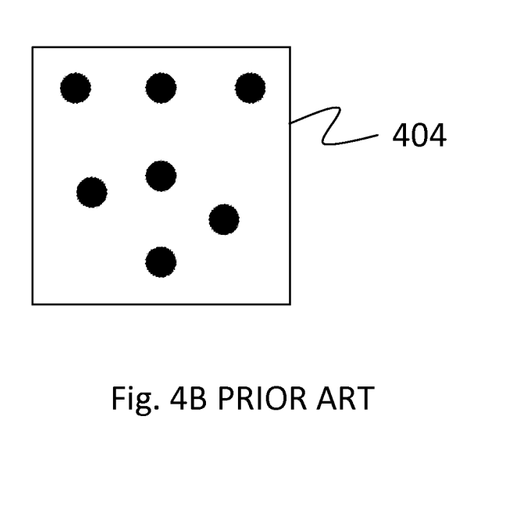

The challenge with this approach is to set the values $w_i$. They can be set arbitrarily high for the target points or they can be set based on the relative accuracy of the target point with respect to surface point. One should also take into account the total number of surface points that are matched. This approach is simple to integrate in the basic framework. Any number of targets can be observed and matched either by tracking, after recognition of target patterns with respect to a model of these targets, using coded targets or even after exploiting an external estimate of the scanner pose obtained with a positioning device. Two example coded targets 402 and 404 are shown in FIG. 4. This approach thus makes it possible to combine constraints from the target positions with constraints imposed by the surface geometry best fit.

A second approach is possible when one considers the extraction of target point positions in images, as highly accurate. Instead of including the constraint imposed by the presence of one or more targets in the calculation of the objective function described beforehand, or any variation of these, the target positions will be exploited for reducing the number of degrees of freedom in the rigid transformation. This will avoid weighing the relative contribution between targets and surface points. Equations for the point-to-plane registration are shown herein but it is clear that someone skilled in the art will obtain the equivalent equations for the point-to-point registration from the same exposed principles for constraining the degrees of freedom.

Constraint from a Single Target

Figure 2:
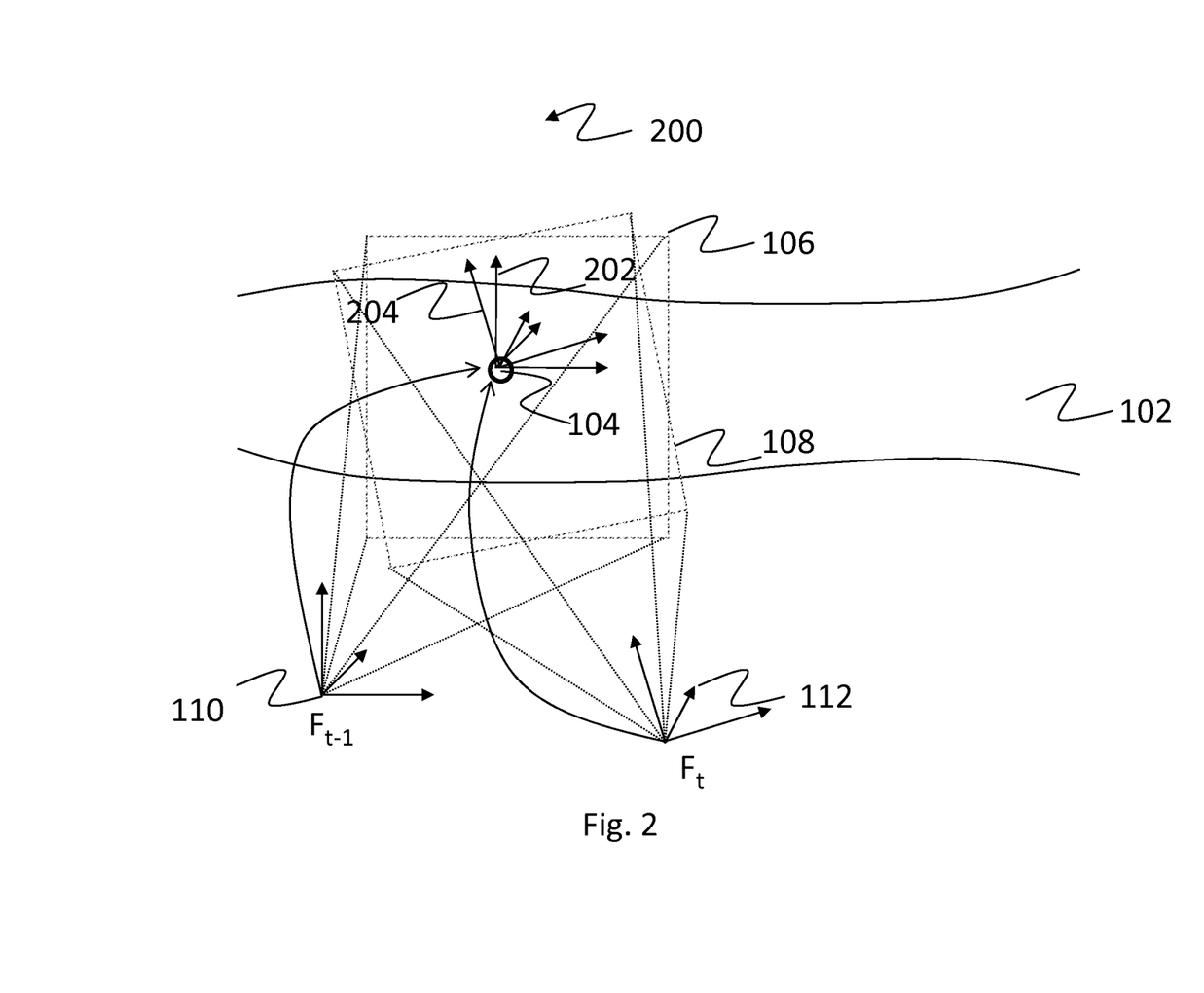
FIG. 2 shows the scanning of an object with two frames including the observation of a target and the translation of the two coordinate systems to coincide with the target.

First consider the case of a single target that is re-observed. One can translate the origins of both the current frame and the model frame to the position of the target. In this way, the translation between both the newly observed frame and the model frame is eliminated. The two translated coordinate systems 202 and 204 are shown in FIG. 2. Formally, a change of variable is applied in $F_3$:

$$X'_i = X_i - X_T$$

$$Y'_i = Y_i - Y_T$$

where $X_T$ and $Y_T$ are the target position in the current and model frames respectively. This change of variables eliminates the translation between the two frames. The new objective function is $$F_4 = \Sigma_{i=1}^N w_i (N_i^T (R(\theta,\phi,\omega) X'_i - Y'_i))^2. \quad \text{(eq. 4)}$$

The problem to be solved becomes:

$$\underset{\theta,\varphi,\omega}{\operatorname{argmin}} \sum_{i=1}^{N} w_i (N_i^T (R(\theta, \varphi, \omega) X'_i - Y'_i))^2$$

Thus, there is only the rotation matrix to estimate. The translation vector is set from the observation of the target. The same principle would apply to the point to point objective function $F_1$ and its variants. One way to minimize $F_4$ with respect to $\theta,\phi,\omega$ follows the same approach as for $F_3$; that is after linearization. One will obtain the matrix R that maps $X'_i$ to $Y'_i$:

$$Y'_i = R X'_i$$

Finally, one will recover the translation vector after replacing $X'_i$ and $Y'_i$ with the expressions for $X'_i$ to $Y_i$ $$Y_i = RX_i - RX_T + Y_T, \quad R \xrightarrow{\text{yields}} R,$$

$$T \xrightarrow{\text{yields}} -RX_T + Y_T.$$

When the target normal is measured, a single angular parameter needs to be optimized. In this case, the equations transform to the following.

$$X'_i = R_s(X_i - X_T)$$

$$Y'_i = R'_s(Y_i - Y_T)$$

R and R' are rotation matrices that align one axis, the z axis for example, with the target normal in the current and model frames respectively. This change of variables leaves only one angular DOF between the two frames. The new objective function is $$F_5 = \Sigma_{i=1}^N w_i (N_i^T (R(\theta) X'_i - Y'_i))^2. \quad (\text{Eq. 5})$$

The problem to be solved becomes:

$$\operatorname*{argmin}_\theta \sum_{i=1}^N w_i (N_i^T (R(\theta) X'_i - Y'_i))^2$$

One will obtain the matrix R that maps $X'_i$ to $Y'_i$:

$$Y'_i = RX'_i$$

Finally, one will recover the translation vector after replacing $X'_i$ and $Y'_i$ with the expressions for $X_i$ to $Y_i$ $$Y_i = R'^T_s RR_s X_i - R'^T_s RR_s X_T + Y_T,$$

$$R \xrightarrow{\text{yields}} R'^T_s RR_s, \quad T \xrightarrow{\text{yields}} -R'^T_s RR_s X_T + Y_T.$$

It is thus possible to apply pose refinement given the reobservation of a single target along with the surface geometry using one of these two latter objective functions. For coarse registration, one can use the same optimization scheme to test whether the sensor is currently observing one previously observed target. To do so, one will repeatedly start the optimization with different values for the free angular DOFs. The pose will be validated after convergence of the match-and-optimize loop process. The final pose is valid if the surface fits well with the model, namely that the portion of the surface which overlaps with the model is closer than a given threshold distance. Moreover, the pose is valid if it fits well and if no other initial value has led to a different pose with a good fit. The same validation is applied around other isolated targets to make sure that there is no ambiguity with the current pose. When the pose is ambiguous, the corresponding target sites may be tagged by the system as irrelevant for coarse positioning.

Constraint from Two Target Points

Figure 3:
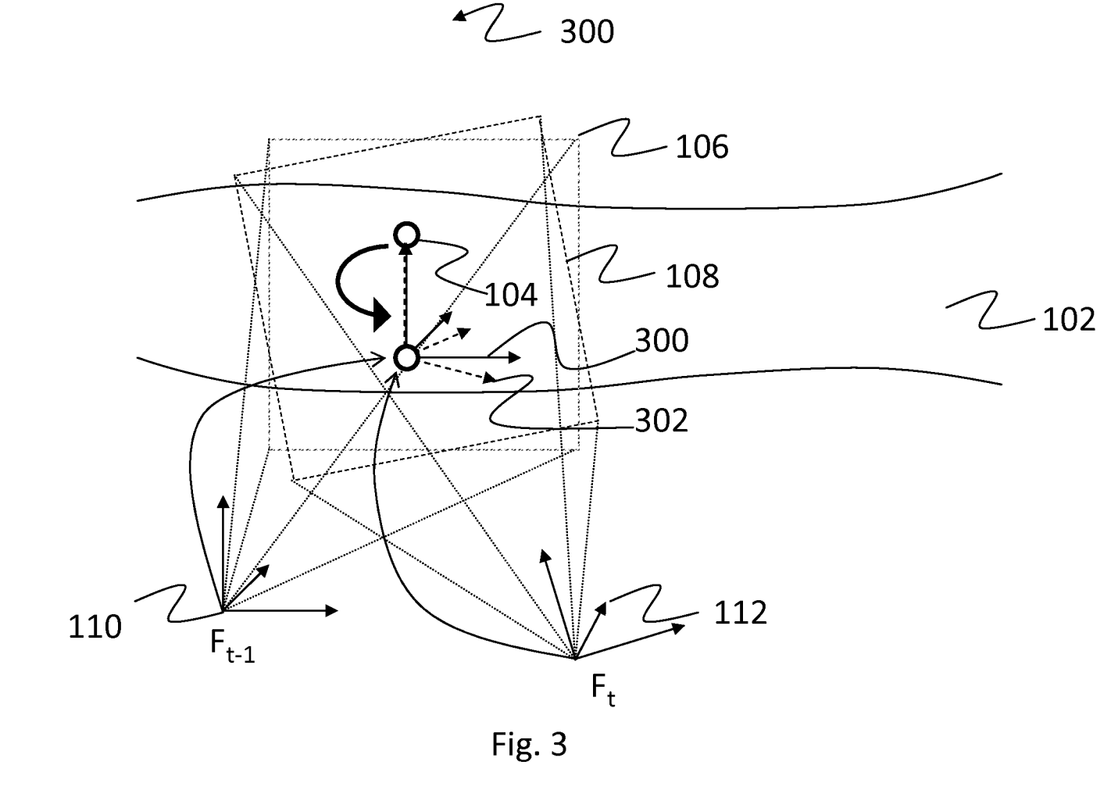
FIG. 3 shows the scanning of an object with two frames including the observation of two target points and the translation and rotation of the two coordinate systems to coincide with the targets.

When two target points can be matched and their positions are reliable, one can set two or three translation parameters such as in the preceding cases. One can further set two degrees of freedom for the rotation matrix and let only one angular parameter to be optimized using the geometry of the surface. Actually, the geometry will contribute to the estimation of the angle of rotation around the axis oriented along the segment joining the two target points. This situation is depicted in FIG. 3.

The objective function can be formulated considering a fixed rotation, $R_s$, of the coordinate system $F_t$ that will align one axis of $F_t$ along the segment defined by the two targets. In the same way, the same axis of the coordinate system of the model frame will be aligned with the segment using another fixed rotation, $R'_s$. Finally, the rotation matrix R will depend on a single parameter, for instance, $\theta$. Once again, a change of variable in $F_3$ is carried out as follows:

$$X'_i = R_s(X_i - X_T)$$

$$Y'_i = R'_s(Y_i - Y_T)$$

This change of variables eliminates the translation between the two frames. The new objective function is $$F_6 = \Sigma_{i=1}^N w_i (N_i^T (R(\theta) X'_i - Y'_i))^2. \quad (\text{Eq. 5})$$

The problem to be solved becomes:

$$\operatorname*{argmin}_\theta \sum_{i=1}^N w_i (N_i^T (R(\theta) X'_i - Y'_i))^2$$

One will obtain the matrix R that maps $X'_i$ to $Y'_i$:

$$Y'_i = RX'_i$$

Finally, one will recover the complete rotation matrix and the translation vector after replacing $X'_i$ and $Y'_i$ with the expressions for $X_i$ to $Y_i$ $$Y_i = R'^T_s RR_s X_i - R'^T_s RR_s X_T + Y_T,$$

$$R \xrightarrow{\text{yields}} R'^T_s RR_s, \quad T \xrightarrow{\text{yields}} -R'^T_s RR_s X_T + Y_T.$$

Following the same reasoning when using a single target, coarse registration can be calculated and the pose can be validated for its uniqueness (non-ambiguity). In this case, the distance between the two targets is also considered to discriminate between the subsets of observed targets.

Objective functions F1 to F6 are examples of variations that make it possible to constrain a subset among the six degrees of freedom of the rigid transformation between a 3D frame and a model frame. It is clear that any subset of parameters can be optimized following the same principle.

When three or more targets are reobserved, a 6 DOF pose can be computed based solely on the targets. The pose is fully constrained.

In all situations however, it is possible to combine the surface points with the targets to obtain the best pose estimate. This can be done following F2, F3 or any other variations including F4 to F6. The weight $w_i$ can be based on the relative confidence of the points and targets. One typical way to set this relative confidence is based on the covariance matrix of the observation. An example is described in "Reliable 3D surface acquisition, registration and validation using statistical error models" by J. Guehring in Proceedings of The International Conference on 3-D Digital Imaging and Modeling (3DIM), 2001, where points are weighted in an ICP-based algorithm for surface alignment.

Figure 5:
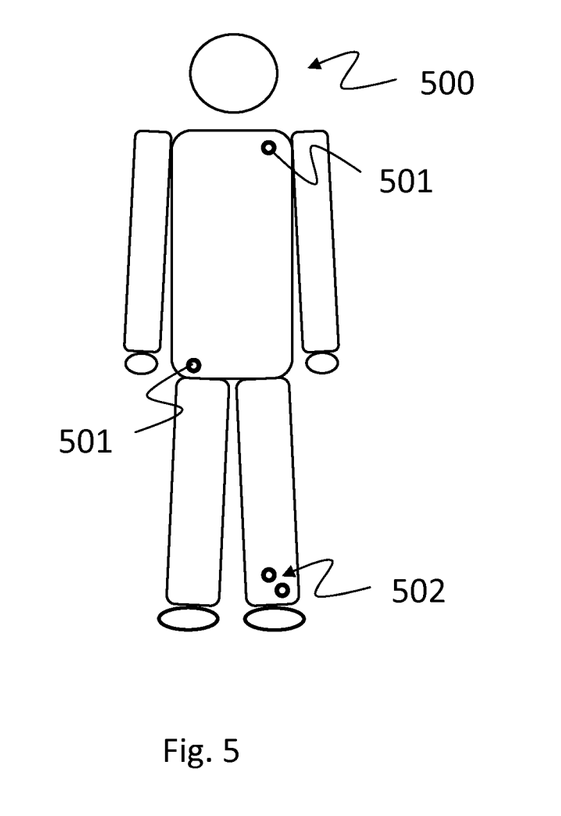
FIG. 5 shows an example of an object to be scanned with isolated target sites.

FIG. 5 shows an object to be scanned 500 on which targets are affixed at three sites. In this example, two sites 501 are tagged with a single target and one site 502 is tagged with a set of two targets. With the present method and system, it is possible to start scanning the object at one of these sites and progress along the object using ICP-based pose tracking before integrating the 3D surface measurement in the 3D object model. When targets are observed, they are also integrated in the 3D object model coordinate system. If one resumes scanning after an interruption, the method and system allow referencing of the position of the 3D sensor after re-observation of one of these observed target sites. When the number of observed targets is less than three, the system cannot calculate a 6 DOF pose from the targets. The system will thus sequentially try to match the currently observed target site to each of the previously modeled sites after initializing pose refinement using the target information, the observed surface shape and sampling the missing angular DOF. For example, using less than ten sites on the surface makes it easier to find a match quickly. It is clear that distinctive shape features on the observed object could also be used for the same purpose. These distinctive shape features would need to be reobservable from different viewpoints to be used as targets. Nevertheless, using targets or signs makes the number of sites, and thus the computational complexity, independent of the observed shape. Moreover, when higher precision is an issue, the precise extraction of targets can be performed.

Example Method Steps

Figure 6:
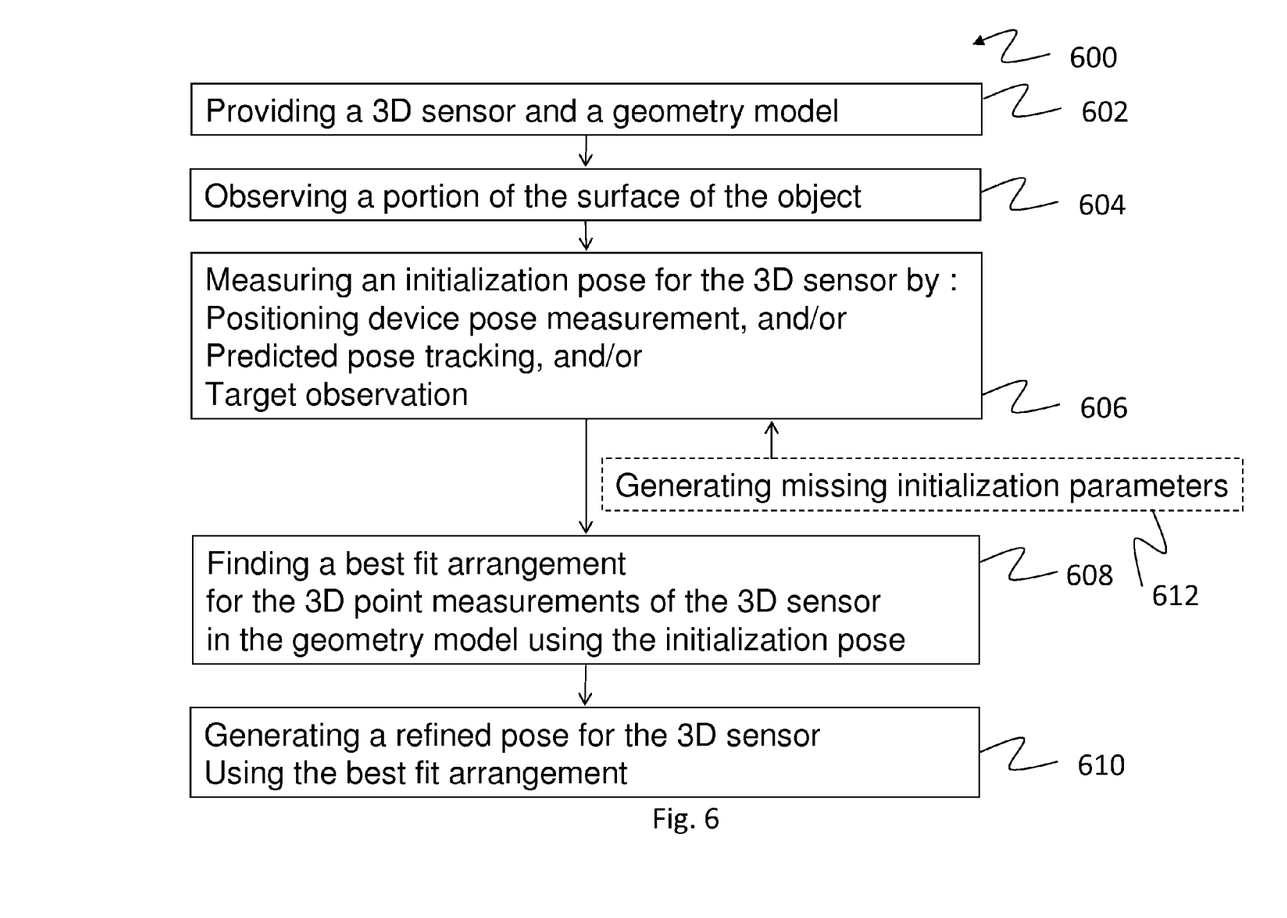
FIG. 6 is a flow chart of an example method for obtaining a refined pose for a 3D sensor for online 3D modeling of a surface geometry of an object.

With reference to FIG. 6, an example method 600 for obtaining a refined pose for a 3D sensor for online 3D modeling of a surface geometry of an object will now be described. The method comprises providing the 3D sensor and a geometry model of at least part of the surface 602; observing a portion of the surface of the object with the 3D sensor 604; measuring an initialization pose for the 3D sensor 606 by positioning device pose measurement (see FIG. 7) and/or predicted pose tracking (see FIG. 8) and/or target observation (see FIG. 9); finding a best fit arrangement of the 3D point measurements in the geometry model using the initialization pose 608 and generating the refined pose for the 3D sensor using the best fit arrangement 610.

In one embodiment, the refined pose includes at least one parameter of the initialization pose.

In one embodiment, finding a best fit arrangement includes weighting geometry surface points and target points to find the best fit arrangement.

In one embodiment, the initialization pose includes at least one parameter measured by the positioning device pose measurement and at least one parameter measured by the target observation.

Figure 7:
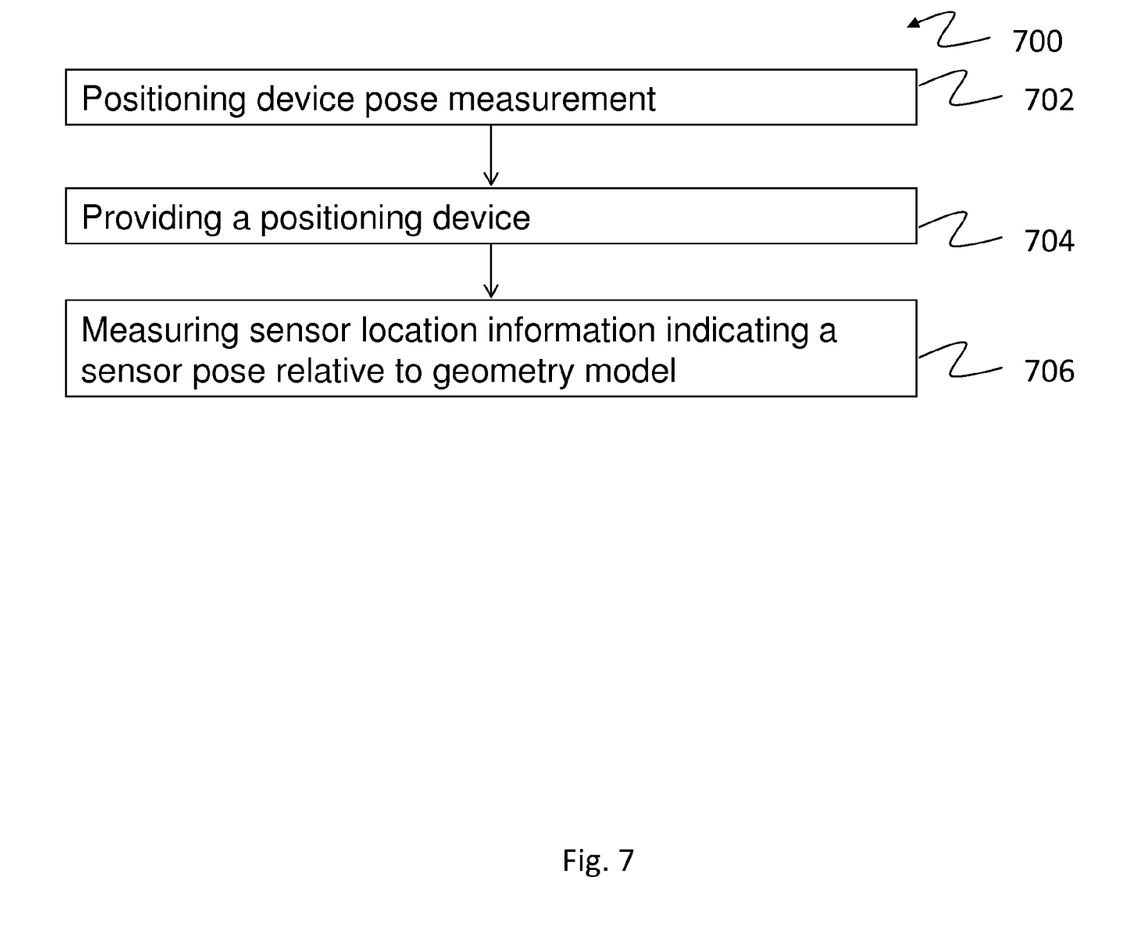
FIG. 7 is a flow chart of an example method of positioning device pose measurement.

With reference to FIG. 7, the example steps 700 for the positioning device pose measurement 702 include providing a positioning device 704 and measuring sensor location information indicating a device pose of the 3D sensor relative to the geometry model using the positioning device 706.

In one embodiment, the positioning device is at least one of a referenced mechanical device, an optical tracking device, an electromagnetic system, an acoustic system and an inertial system.

Figure 8:
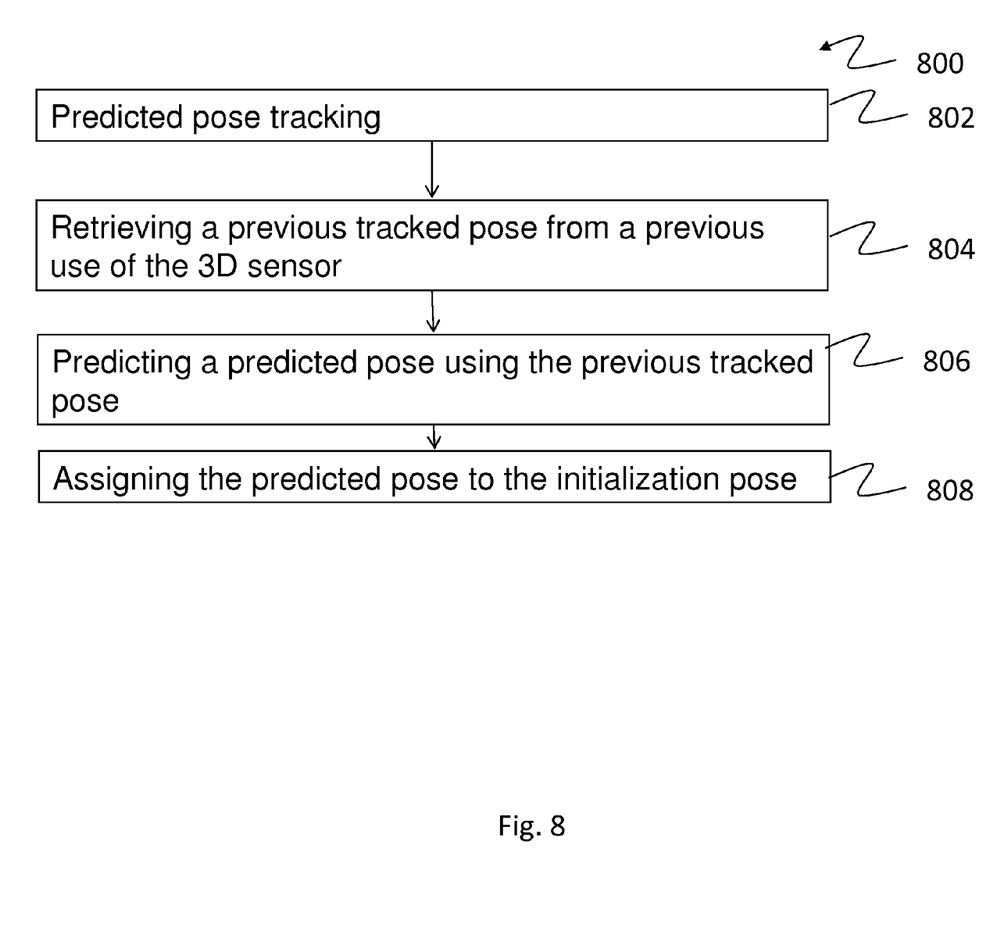
FIG. 8 is a flow chart of an example method of predicted pose tracking.

With reference to FIG. 8, the example steps 800 for the predicted pose tracking 802 include retrieving a previous tracked pose from a previous instance of the capture of the 3D point measurements 804; and assigning a predicted pose to the initialization pose 808, the predicted pose being predicted using the previous tracked pose 806.

Figure 9:
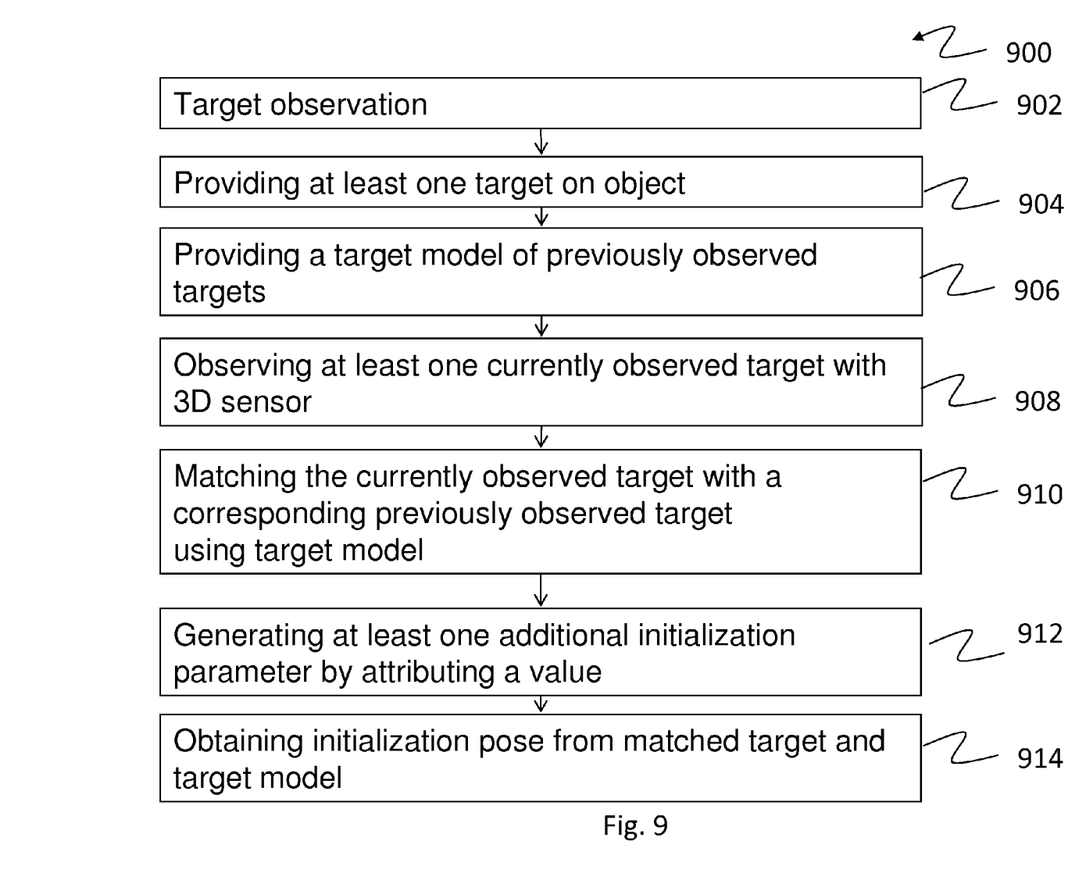
FIG. 9 is a flow chart of an example method of target observation.

With reference to FIG. 9, the example steps 900 of the target observation 902 include providing at least one target on the object 904; providing a target model for the object 906, the target model including previously observed targets; observing at least one currently observed targets 908; matching the currently observed target with a corresponding previously observed target using said target model 910; generating at least one additional initialization parameter for the initialization pose by attributing a value for the additional initialization parameter 912; obtaining the initialization pose from the matched target and the target model 914.

In one embodiment, the target is at least one of affixed to the surface of the object, affixed to a solidary environment of the object, created on the surface of the object, created on the solidary environment of the object, part of a distinctive shape feature of the object and part of a distinctive shape feature of the solidary environment of the object.

In one embodiment, the target is at least one of a photogrammetric target, a retro-reflective target, a coded target, a circular target, a simply reflective target, a drawn mark and a distinctive shape feature.

In one embodiment, obtaining the initialization pose from the matched target and the target model includes obtaining a surface normal for the target.

In one embodiment, two of the targets are currently observed targets, the target observation further comprising comparing a distance between the currently observed targets to distances between previously observed targets in the target model to eliminate candidate sites for the match.

In one embodiment, target observation further comprises selecting a candidate site for the match in the target model based on a quantity of the currently observed targets; wherein the matching including sequentially testing, at each candidate site, the currently observed targets for the match with a same number of previously observed targets in the target model and the finding the best fit arrangement includes using each tested match and selecting a converging best fit arrangement.

In one embodiment, the method can optionally comprise generating missing initialization parameters for the initialization pose 612 if the initialization pose includes less than the six degrees of freedom, by attributing a value for the missing initialization parameter. In one embodiment, generating missing initialization parameters includes sampling a parameter space of the initialization pose, using each sampled initialization parameters to find the best fit arrangement and selecting a converging best fit arrangement.

Example System Components

Figure 10:
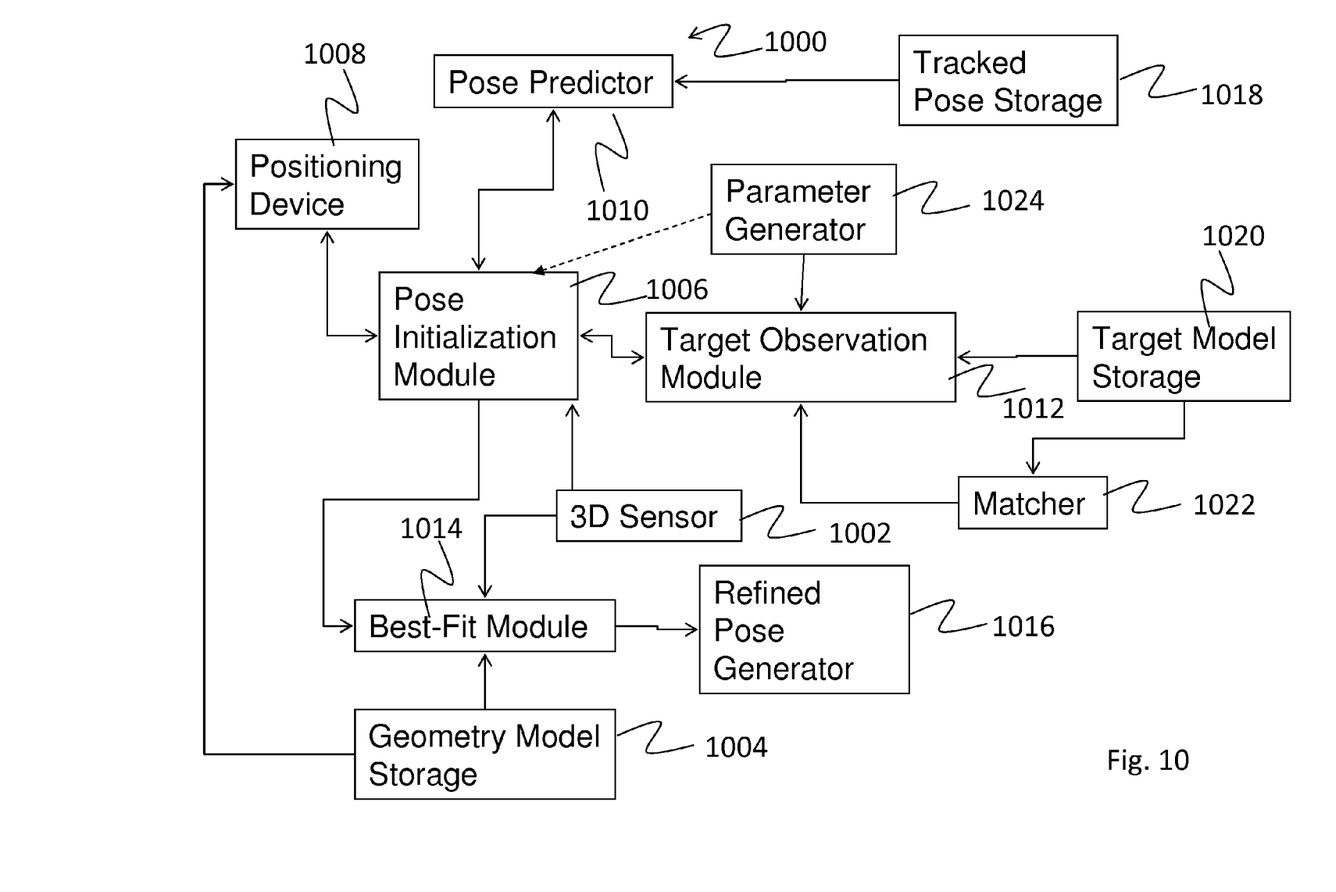
FIG. 10 shows a block diagram of the main components of an example system to obtain a refined pose for a 3D sensor for online 3D modeling of a surface geometry of an object.

With reference to FIG. 10, an example system 1000 for obtaining a refined pose for a 3D sensor for online 3D modeling of a surface geometry of an object will now be described.

A 3D sensor 1002 is adapted to capture 3D point measurements of the surface of the object from a viewpoint. Geometry model storage 1004 stores a previously acquired geometry model of at least part of the surface. A pose initialization module 1006 outputs an initialization pose for the 3D sensor. The pose initialization module receives partial or complete initialization pose information from a positioning device 1008 and/or a pose predictor 1010 and/or a target observation module 1012. A best-fit module 1014 finds a best fit arrangement of the 3D point measurements of the 3D sensor in the geometry model using the initialization pose. A refined pose generator 1016 outputs a refined pose for the 3D sensor using the best fit arrangement.

The positioning device outputs a device pose of the 3D sensor relative to the geometry model. The positioning device can be a referenced mechanical device, an optical tracking device, an electromagnetic system, an acoustic system, an inertial system, etc.

The pose predictor includes tracked pose storage 1018 for storing a previously tracked pose of the 3D sensor.

The target observation module includes target model storage 1020 for storing a target model of previously observed targets of the object, a matcher 1022 for matching the currently observed target with a corresponding previously observed targets using the target model. A parameter generator 1024 is used to generate at least one additional initialization parameter for the initialization pose obtained by the matched targets by attributing a value for the additional initialization parameter.

In some embodiments, at least one target is provided. The target can be affixed to the surface of the object, affixed to an environment of the object (as long as the environment is solidary with the object and that it cannot be displaced independently of the object during modeling), created on the surface of the object and/or created on the environment of the object, part of a distinctive shape feature of said object and part of a distinctive shape feature of said solidary environment of said object. For example, the targets can be provided on a mat on which is placed the object to be modeled. The target can be a photogrammetric target, a retro-reflective target, a coded target, a circular target, a simply reflective target, a drawn mark and a distinctive shape feature.

In one embodiment, the parameter generator 1024 is also used for generating missing initialization parameters for the initialization pose if the initialization pose includes less than the six degrees of freedom.

In some embodiments of the system, the 3D sensor and the positioning device are provided in a single system adapted to perform the steps of both components. For example, the same cameras can be used both to capture the 3D point measurements and to generate sensor location information using targets on the object. The two functionalities of the single system can be carried out simultaneously or in an alternating mode, depending on the design of the single system. When a single system is provided, the 3D sensor is referred to as being "self-referenced".

In other embodiments, the 3D sensor and the positioning device are provided in a single casing but the casing includes separate components for both the 3D sensor and the positioning device.

As will be readily understood, the geometry model and the target model which can be retrieved from the geometry model storage and the target model storage, respectively, could have been stored in a previous scanning session, which does not need to be immediately before the current scanning session. It is indeed possible to begin scanning of an object, stop the session and continue the scanning at a later time, during another scanning session.

Although the above description relates to example embodiment as presently contemplated by the inventors, it will be understood that the invention in its broad aspect includes equivalents of the elements described herein.

The embodiments described above are intended to be exemplary only. The scope of the invention is therefore intended to be limited solely by the appended claims.

The invention claimed is:

1. A method for obtaining a refined pose for a 3D sensor for online 3D modeling of a surface geometry of a surface of an object, said pose encompassing six degrees of freedom (DOF) including three translation parameters and three orientation parameters, the method comprising:
   providing said 3D sensor, said 3D sensor being adapted to capture 3D point measurements of said surface of said object from a viewpoint;
   providing a geometry model of at least part of said surface;
   providing at least one target on said object;
   providing a target model for said object, said target model including previously observed targets among said at least one target provided on said object;
   observing a portion of said surface of said object with said 3D sensor including observing less than three currently observed targets and capturing currently captured 3D point measurements;
   matching said currently observed targets with a corresponding matched target of said previously observed targets using said target model to obtain partial positioning constraints, said partial positioning constraints defining less than said six degrees of freedom and defining said three translation parameters;
   generating at least one missing initialization parameter from said previously observed targets, each said at least one missing initialization parameter being one of said three orientation parameters;
   obtaining an initialization pose from said partial positioning constraints and said missing initialization parameter, said initialization pose encompassing said six degrees of freedom;
   finding a best fit arrangement of said currently captured 3D point measurements in said geometry model using said initialization pose, said finding said best fit arrangement being constrained for at least said three translation parameters by said partial positioning constraints;
   generating said refined pose for said 3D sensor using said best fit arrangement.

2. The method for obtaining a refined pose as claimed in claim 1, wherein obtaining said initialization pose from said partial positioning constraints and said missing initialization parameter includes obtaining a surface normal for said currently observed targets.

3. The method for obtaining a refined pose as claimed in claim 1, wherein said generating at least one missing initialization parameter includes sampling a parameter space of said initialization pose and said finding said best fit arrangement includes using each sampled initialization parameters and selecting a converging best fit arrangement.

4. The method for obtaining a refined pose as claimed in claim 1, wherein said less than three currently observed targets is two currently observed targets, said matching further comprising comparing a distance between said two currently observed targets to distances between previously observed targets in said target model to eliminate candidate sites for said match.

5. The method for obtaining a refined pose as claimed in claim 1, wherein said finding said best fit arrangement includes weighting said currently captured 3D point measurements and said partial positioning constraints to find said best fit arrangement.

6. The method for obtaining a refined pose as claimed in claim 1, further comprising:
   providing a positioning device, wherein said positioning device is at least one of a referenced mechanical device, an optical tracking device, an electromagnetic system, an acoustic system and an inertial system;
   measuring sensor location information indicating a device pose of said 3D sensor relative to the geometry model using said positioning device;
   wherein said obtaining said initialization pose includes using said sensor location information in addition to said partial positioning constraints and said missing initialization parameter.

7. The method for obtaining a refined pose as claimed in claim 1, wherein said target is at least one of affixed to said surface of said object, affixed to a solidary environment of said object, created on said surface of said object, created on said solidary environment of said object, part of a distinctive shape feature of said object and part of a distinctive shape feature of said solidary environment of said object.

8. The method for obtaining a refined pose as claimed in claim 1, wherein said target is at least one of a photogrammetric target, a retro-reflective target, a coded target, a circular target, a simply reflective target, a drawn mark and a distinctive shape feature.

9. The method for obtaining a refined pose as claimed in claim 1, further comprising
  retrieving a previous tracked pose from a previous instance of said capture of said 3D point measurements;
  wherein said obtaining said initialization pose includes using said previous tracked pose in addition to said partial positioning constraints and said missing initialization parameter.

10. The method for obtaining a refined pose as claimed in claim 1, wherein said matching further comprises selecting a candidate site for said match in said target model based on a quantity of said currently observed targets; wherein said matching includes sequentially testing, at each said candidate site, said currently observed targets for said match with a same number of previously observed targets in said target model and said finding said best fit arrangement includes using each tested match and selecting a converging best fit arrangement.

\* \* \* \* \*